United States Patent
Bianchi et al.

(10) Patent No.: US 11,465,943 B2
(45) Date of Patent: Oct. 11, 2022

(54) COMPONENT PROTECTED BY AN ENVIRONMENTAL BARRIER

(71) Applicant: SAFRAN, Paris (FR)

(72) Inventors: Luc Bianchi, Moissy-Cramayel (FR); Hugues Denis Joubert, Moissy-Cramayel (FR); Philippe Picot, Moissy-Cramayel (FR); Amar Saboundji, Moissy-Cramayel (FR)

(73) Assignee: SAFRAN, Paris (FR)

( * ) Notice: Subject to any disclaimer, the term of this patent is extended or adjusted under 35 U.S.C. 154(b) by 388 days.

(21) Appl. No.: 16/753,588

(22) PCT Filed: Oct. 3, 2018

(86) PCT No.: PCT/FR2018/052439
§ 371 (c)(1),
(2) Date: Apr. 3, 2020

(87) PCT Pub. No.: WO2019/069023
PCT Pub. Date: Apr. 11, 2019

(65) Prior Publication Data
US 2020/0331817 A1 Oct. 22, 2020

(30) Foreign Application Priority Data
Oct. 5, 2017 (FR) ...................................... 1759326

(51) Int. Cl.
*C04B 41/00* (2006.01)
*C23C 4/134* (2016.01)
(Continued)

(52) U.S. Cl.
CPC ........ *C04B 41/009* (2013.01); *C04B 41/4527* (2013.01); *C04B 41/5059* (2013.01);
(Continued)

(58) Field of Classification Search
None
See application file for complete search history.

(56) References Cited

U.S. PATENT DOCUMENTS

| 8,658,255 B2 | 2/2014 | Kirby et al. |
| 2005/0003212 A1 | 1/2005 | Sun et al. |

(Continued)

FOREIGN PATENT DOCUMENTS

| CN | 101024324 A | 8/2007 |
| CN | 104428448 A | 3/2015 |

(Continued)

OTHER PUBLICATIONS

International Search Report as issued in International Patent Application No. PCT/FR2018/052439, dated Feb. 13, 2019.
(Continued)

*Primary Examiner* — Joel G Horning
(74) *Attorney, Agent, or Firm* — Pillsbury Winthrop Shaw Pittman LLP

(57) ABSTRACT

A component includes a substrate at least a portion of which adjacent to a surface of the substrate is made of a material including silicon; a bond coat located on the surface of the substrate and including silicon, an environmental barrier which includes an outer layer of ceramic material covering the bond coat, wherein the environmental barrier further includes a self-healing inner layer located between the bond coat and the outer layer, the inner layer including a matrix in which silico-forming particles are dispersed, these particles being capable of generating a matrix crack healing phase in the presence of oxygen.

15 Claims, 3 Drawing Sheets

(51) Int. Cl.
    *C04B 41/45* (2006.01)
    *C04B 41/50* (2006.01)
    *C04B 41/52* (2006.01)
    *C23C 4/10* (2016.01)
    *C23C 28/04* (2006.01)
    *F01D 5/28* (2006.01)

(52) U.S. Cl.
    CPC ...... *C04B 41/5066* (2013.01); *C04B 41/5096* (2013.01); *C04B 41/52* (2013.01); *C23C 4/10* (2013.01); *C23C 4/134* (2016.01); *C23C 28/042* (2013.01); *F01D 5/288* (2013.01)

(56) References Cited

U.S. PATENT DOCUMENTS

| | | |
|---|---|---|
| 2009/0169873 A1 | 7/2009 | Louchet-Pouillerie et al. |
| 2009/0220776 A1 | 9/2009 | Meschter et al. |
| 2009/0250153 A1 | 10/2009 | Meschter et al. |
| 2010/0159150 A1 | 6/2010 | Kirby et al. |
| 2011/0256411 A1 | 10/2011 | Courcot et al. |
| 2014/0011038 A1 | 1/2014 | Das et al. |

FOREIGN PATENT DOCUMENTS

| | | |
|---|---|---|
| EP | 1 479 657 A1 | 11/2004 |
| EP | 2 189 504 A1 | 5/2010 |
| EP | 2 918 698 A1 | 9/2015 |
| RU | 2436868 C2 | 12/2011 |
| RU | 2519250 C2 | 6/2014 |

OTHER PUBLICATIONS

Kunz, W., et al., "Self-Healing EBC Material for Gas Turbine Applications," Advances in High Temperature Ceramic Matrix Composites and Materials for Sustainable Development, Ceramic Transactions, vol. CCLXIII, May 2017, The American Ceramic Society, XP055477677, pp. 175-185.

Derelioglu, Z., et al., "Healing Particles in Self-Healing Thermal Barrier Coatings," Proceedings of the 4$^{th}$ International Conference on Self-Healing Materials, Jun. 2013, XP055477690, pp. 578-581.

Greil, P., "Generic principles of crack-healing ceramics," Journal of Advanced Ceramics, vol. 1, No. 4, Dec. 2012, XP0554477992, pp. 249-267.

COMPONENT PROTECTED BY AN ENVIRONMENTAL BARRIER

CROSS-REFERENCE TO RELATED APPLICATIONS

This application is the U.S. National Stage of PCT/FR2018/052439, filed Oct. 3, 2018, which in turn claims priority to French patent application number 1759326 filed Oct. 5, 2017. The content of these applications are incorporated herein by reference in their entireties.

BACKGROUND OF THE INVENTION

The present invention relates to the general field of corrosion protection of components made of ceramic-matrix composite (CMC) material.

A particular field of application of the invention is the protection of components made of ceramic-matrix composite (CMC) material forming hot parts of gas turbines, such as combustion chamber walls, or turbine rings, turbine nozzles or turbine blades, for aeronautical engines or industrial turbines.

For such gas turbines, the concern to improve efficiency and reduce pollutant emissions leads to the consideration of ever higher temperatures in the combustion chambers.

It was therefore proposed to replace metallic materials with CMC materials, in particular for combustion chamber walls or turbine rings. Indeed, CMC materials are known to have both good mechanical properties allowing their use for structural elements and the ability to maintain these properties at high temperatures. CMC materials comprise a fibrous reinforcement of refractory fibers, typically carbon or ceramic, which is densified by a ceramic matrix, for example SiC.

In the operating conditions of aeronautical turbines, i.e. at high temperature in an oxidizing and humid atmosphere, CMC materials are sensitive to the corrosion phenomenon. CMC corrosion results from the oxidation of SiC to silica which, in the presence of water vapor, volatilizes in the form of silicon hydroxides $Si(OH)_4$. The corrosion phenomena cause a recession of the CMC and affect its service life.

In order to limit this degradation during operation, it was considered to form environmental barrier coatings on the surface of the CMC materials. Such a prior art solution is illustrated in FIG. 1.

Thus, as shown in FIG. 1, a substrate 1 of ceramic-matrix composite (CMC) material is covered by a silicon bonding layer 2, said bonding layer 2 being itself covered by an environmental barrier 3 which may be a layer of rare earth silicate. During operation of the gas turbine engine, a protective silica layer 2a is formed between the silicon bonding layer 2 and the environmental barrier 3.

The bonding layer 2 improves the adhesion of the environmental barrier 3 and forms the protective silica layer 2a, whose low oxygen permeability helps to protect the CMC substrate 1 against oxidation.

The environmental barrier 3, in turn, limits the diffusion of water vapor towards the protective silica layer 2a formed by oxidation of the silicon of the bonding layer 2, and therefore limits the recession of the latter.

However, a problem with this prior art solution is that the accessibility of the protective silica layer 2a to water vapor and air is locally very variable.

These local differences in accessibility are mainly due to local differences in the density of the environmental barrier 3, the tortuosity of the network of microcracks and porosities in the environmental barrier 3 responsible for preferred oxygen pathways, and local heterogeneities in composition or in the crystal lattice of the environmental barrier 3.

These local differences in accessibility can induce local differences in thickness in the protective silica layer 2a potentially responsible for stress build-up and premature deterioration of the component by delamination.

There is therefore a need for a novel system to protect a CMC substrate against corrosion, to increase the service life of CMC components.

SUBJECT MATTER AND SUMMARY OF THE INVENTION

The main purpose of the present invention is therefore to compensate for such disadvantages by offering a part comprising:

a substrate at least a portion of which adjacent to a surface of the substrate is made of a material comprising silicon;

a bond coat located on the surface of the substrate and comprising silicon, an environmental barrier which comprises an outer ceramic layer covering the bond coat, said environmental barrier further comprising a self-healing inner layer located between the bond coat and the outer layer, said inner layer comprising a matrix in which are dispersed silico-forming particles, these particles being capable of generating a matrix crack healing phase in the presence of oxygen.

Such an inner layer of the environmental barrier offers the advantage of reducing the amount of water and air reaching the bond coat and reducing the heterogeneity in the amount of water and air passing through the environmental barrier.

Indeed, the particles being silico-forming, i.e. of such a nature as to form silica ($SiO_2$) when oxidized, said particles dispersed in the matrix of the inner layer react on contact with oxygen to generate a healing phase which seals said inner layer. The particles comprise silicon.

In addition, such a reaction of the particles with oxygen consumes some of the water and air passing through the inner layer of the environmental barrier, thus limiting the amount of air and water transmitted to the bond coat and reducing heterogeneities.

Moreover, the particles of the inner layer may comprise ceramic particles, preferably particles of silicon carbide, or silicon nitride, or of a MAX phase comprising silicon, or a mixture of such particles.

The particles of the inner layer may also include metal particles, preferably particles of elemental silicon Si, or a metal silicide, or a mixture of such particles.

According to one possible feature, the particles of the inner layer have an average size less than or equal to 5 µm, and preferably less than or equal to 2 µm.

"Average size" refers to the dimension given by the statistical size distribution to half the population, known as D50.

In addition, the inner layer may have a particle volume charge rate greater than or equal to 5% and less than 50%, and preferentially between 20% and 40%.

According to an additional feature, the inner layer has a thickness between 10 µm and 300 µm, and preferentially between 100 µm and 200 µm.

The matrix of the inner layer can also be made of silicate, preferably a rare earth monosilicate or disilicate, or an aluminosilicate such as mullite, or cordierite.

According to another feature, the matrix of the inner and outer layers is made of the same material.

According to a second aspect, the invention proposes a process for manufacturing a component according to any of the preceding features, comprising the following steps:

deposition of the bond coat comprising silicon on the surface of the substrate;

deposition of the inner layer of the environmental barrier on the bond coat;

deposition of the outer layer of the environmental barrier on the inner layer, said outer layer being ceramic.

As an additional feature, the deposition of the inner layer is achieved by plasma spraying in which a material intended to form the particles is introduced into a plasma jet in the form of a suspension in a liquid medium.

In addition, a material intended to form the matrix of the inner layer is introduced into the plasma jet in powder form.

According to another feature, the material for forming the matrix of the inner layer is introduced into the plasma jet as a suspension in a liquid medium.

BRIEF DESCRIPTION OF THE DRAWINGS

Other features and advantages of the present invention will be apparent from the description given below, with reference to the appended drawings which illustrate a non-limiting example embodiment. In the figures.

DETAILED DESCRIPTION OF THE INVENTION

In the following detailed description, the formation of an environmental barrier on a silicon-containing CMC substrate is considered. However, the invention is applicable to substrates made of monolithic refractory material containing silicon and, more generally, to substrates of which at least a portion adjacent to an external surface of the substrate is made of a refractory material (composite or monolithic) containing silicon. Thus, the invention is aimed in particular at protecting refractory materials consisting of monolithic ceramics, for example silicon carbide SiC or silicon nitride $Si_3N_4$, but more particularly at protecting refractory composite materials such as ceramic-matrix composite (CMC) materials containing silicon, for example CMCs with a matrix at least partially made of SiC.

Figure 1:
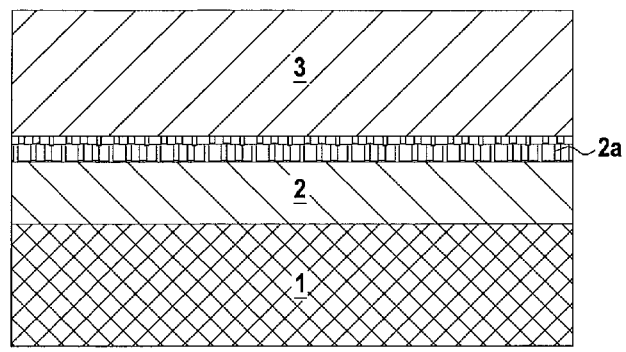
FIG. 1 represents an environmental barrier solution of the prior art.
Figure 2:
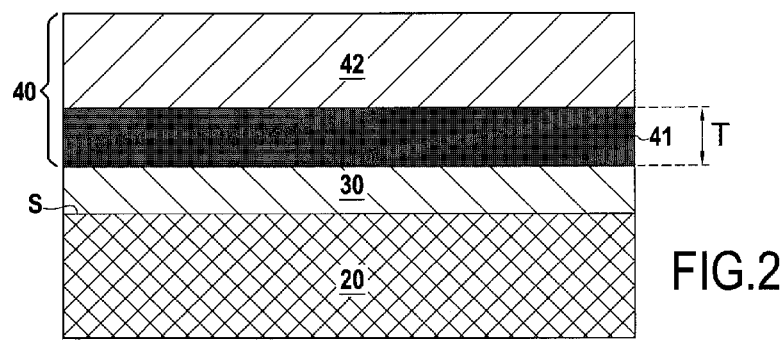
FIG. 2 represents a sectional view of a component according to an embodiment of the invention.

As illustrated in FIG. 2, a component 10 according to the invention comprises a substrate 20 having a surface S. The substrate 20 comprises silicon on at least a portion adjacent to the surface S. The component 10 can typically be a turbine ring of a gas turbine engine.

The substrate 20 may be made of a CMC material containing silicon and which comprises a fibrous reinforcement which may be made of carbon (C) fibers or ceramic fibers, for example SiC or essentially-SiC fibers, including Si—C—O or Si—C—O—N fibers, i.e. also containing oxygen and possibly nitrogen. Such fibers are produced by Nippon Carbon as "Nicalon" or "Hi-Nicalon" or "Hi-Nicalon Type-S", or by Ube Industries as "Tyranno-ZMI". The ceramic fibers can be coated with a thin interphase layer of pyrolytic carbon (PyC), boron nitride (BN) or boron-doped carbon (BC, with 5 at. % to 20 at. % of B, the balance being C).

The fibrous reinforcement is densified by a matrix which is formed, in its entirety or at least in an external phase thereof, by a silicon-containing material, such as a silicon compound, for example SiC or a ternary Si—B—C system. The outer phase of the matrix is defined as the matrix phase formed last, furthest away from the fibers of the reinforcement. Thus, the matrix can be formed of several phases of different natures, and can be for example:

a C—SiC mixed matrix (with SiC on the outer side), or a sequenced matrix with alternating SiC phases and matrix phases of lower stiffness, for example of pyrolytic carbon (PyC), boron nitride (BN) or boron-doped carbon (BC), with a terminal matrix phase of SiC, or a self-healing matrix with matrix phases of boron carbide ($B_4C$) or a ternary Si—B—C system, optionally with free carbon ($B_4C+C$, Si—B—C+C), and with a terminal Si—B—C or SiC phase.

The matrix can be at least partly formed by CVI in a manner known per se. Alternatively, the matrix can be at least partially formed by liquid means (impregnation of the matrix precursor resin and conversion by cross-linking and pyrolysis, the process being repeatable) or by melt-infiltration of silicon. In the latter case, a powder is introduced into the optionally partially densified fibrous reinforcement, which may be a carbon and optionally ceramic powder, and a metal composition based on molten silicon is then infiltrated to form a matrix of the SiC—Si type.

A silicon-containing bond coat 30 is located on the substrate 20. The bond coat 30 is in contact with the substrate 20. The bond coat 30 can typically be silicon (element Si), or mullite ($3Al_2O_3.2SiO_2$). During operation, the bond coat 30 will oxidize and form a passivating layer of silica ($SiO_2$) (thermally-grown oxide).

An environmental barrier 40 is located on the bond coat 30 to protect said bond coat 30 and the substrate 20. The environmental barrier 40 comprises a self-healing inner layer 41 located on the bond coat 30, and an outer ceramic layer 42 located on the inner layer 41. The inner layer 41 is in contact with the bond coat 30 on one side and the outer layer 42 on the other side.

Self-healing material is defined here as a material which, in the presence of oxygen, forms a vitreous composition capable of healing cracks in the material by changing to a pasty or fluid state within a certain temperature range.

Figure 3:
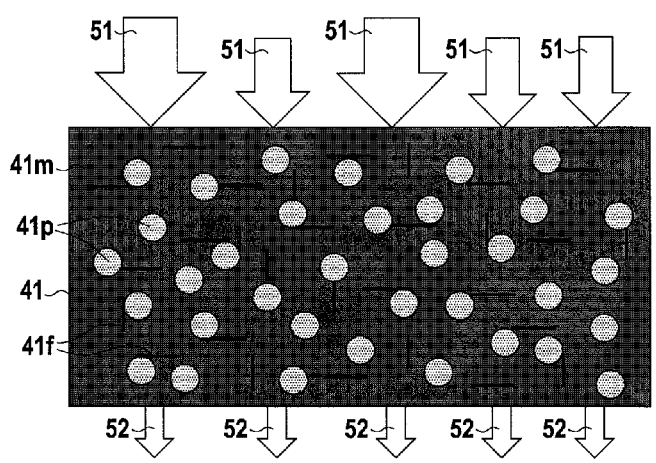
FIG. 3 shows a detailed view of the inner layer of the environmental barrier.

As can be seen in FIG. 3, the inner layer 41 comprises a matrix 41m in which particles 41p are dispersed. The matrix 41m is made of a different material from the material of the particles 41p. In addition, the matrix 41m contains cracks 41f and other porosities.

The particles 41p are silico-forming particles and are therefore able to generate a healing phase of the cracks 41f of the matrix 41m in the presence of oxygen. The particles 41p are particularly suitable for generating the healing phase when the temperature is above 800° C. The particles 41p comprise silicon.

In fact, during operation, air and water flows 51 cross the outer layer 42 of the environmental barrier 40 and reach the inner layer 41 of said environmental barrier 40. The particles 41p being silico-forming, they react with oxygen and form silica (SiO$_2$). This silica generated by the particles 41p forms the healing phase and fills by capillarity the cracks 41f and other porosities of the matrix 41m, thereby sealing the inner layer 41 by limiting the air and water flows 51 through said inner layer 41. Such a self-healing reaction of the inner layer 41 allows, upon contact with the air and water flows 51, said inner layer 41 to seal, thereby reducing the amount of air and water reaching the bond coat 30 via the outgoing flows 52.

Moreover, in addition to sealing the inner layer 41 by filling the cracks 41f, such a self-healing effect consumes part of the water and air, thus further reducing the amount of air and water in the outgoing flows 52 that reach the bond coat 30.

Moreover, as shown in FIG. 3, the amount of air and water is heterogeneous in the flows 51 that arrive on the inner layer 41. The fact that part of the water and air is consumed by the reaction of the particles 41p homogenizes the outgoing flows of air and water that arrive on the bond coat 30. Such homogenization of the outgoing flows 52 reduces the local differences in thickness in the protective silica layer generated by the bond coat 30, thus reducing the risk of stress build-up and premature deterioration of the component 10 by delamination.

Furthermore, in addition to the oxidation reaction, the particles 41p can corrode in the presence of water and air and generate $H_xSi_yO_z$ gas. Such a corrosion reaction of the particles 41p also consumes water and air, thus reducing the amount of water and air reaching the bond coat 30.

The particles 41p can be ceramic particles. The particles 41p are preferentially silicon carbide (SiC) particles, silicon nitride (Si$_3$N$_4$) particles, or particles of a max phase comprising silicon, or a mixture of such particles. Silicon carbide in particular is among the preferred materials.

The particles 41p can also be metallic particles. The particles 41p are preferentially silicon (element Si) particles, particles of a metal silicide, or a mixture of such particles.

The particles 41p preferably have a mean particle size (D50) that is less than or equal to 5 μm. It is indeed advantageous that the particles 41p have an average size less than or equal to 5 μm as this allows the inner layer 41 to be more reactive for the generation of the SiO$_2$ healing phase and for the consumption of air and water. Indeed, the use of small particle size increases the surface area available for the oxidation and corrosion reaction of the particles 41p. Preferably, the particles 41p have an average size less than or equal to 2 μm, for example between 0.1 μm and 2 μm, in order to further increase the reactivity and efficiency of the inner layer 41.

As will be described below, the use of particles smaller than 5 μm in size is permitted in particular by plasma spray deposition where the material for forming the particles 41p is introduced by liquid means.

The inner layer 41 has an advantageous volume charge ratio of particles 41p of greater or equal to 5% and (strictly) less than 50%. This ensures, on the one hand, a better reactivity of the inner layer 41 for the generation of the healing phase and the consumption of water and air as well as a sufficient lifetime of the inner layer 41, and on the other hand, sufficient retention of the properties provided by the matrix 41m. Preferentially, the inner layer 41 comprises a volume charge rate of the particles 41p of between 20% and 40%.

The matrix 41m is advantageously made of silicate, and preferentially a rare earth monosilicate or disilicate, or an aluminosilicate such as mullite, or cordierite. It should be noted that preferably the matrix 41m is not made of barium strontium aluminosilicate (BSAS), as BSAS reacts with silica. A monosilicate or rare earth disilicate matrix 41m is a preferred embodiment. A matrix 41m of Y$_2$Si$_2$O$_7$, RE$_2$Si$_2$O$_7$, or of RE$_2$SiO$_5$ are preferred alternatives of the embodiment according to which the matrix 41m is a rare earth monosilicate or disilicate.

The inner layer 41 has a thickness E which can be between 10 μm and 300 μm. This thickness allows the inner layer 41 to fulfil its role of protecting the bond coat 30. Moreover, when the inner layer 41 has a significant thickness, for example between 200 μm and 300 μm, it can alone ensure the sealing function against water and air of the environmental barrier 40, the upper layer 40 being able to fulfil only the role of abradable. In addition, the thickness T of the inner layer 41 is preferably between 100 μm and 200 μm.

The outer layer 42 of the environmental barrier 40 is made of ceramic. The outer layer 42 can be a conventional environmental barrier layer. The outer layer 42 can be a rare earth monosilicate or disilicate, or an aluminosilicate such as mullite or barium strontium aluminosilicate (BSAS), or cordierite.

Preferably, in order to ensure better mechanical and chemical compatibility between the inner layer 41 and the outer layer 42 of the environmental barrier 40, the matrix 41m of the inner layer 41 and the outer layer 42 are made of the same material. Such a feature is all the more advantageous when the inner layer 41 and the outer layer 42 are in direct contact with each other. Preferably, the matrix 41m of the inner layer 41 and the outer layer 42 are made of monosilicate or rare earth disilicate. In addition, the outer layer 42 can be loaded with fibers or inclusions depending on the properties to be given to said outer layer 42.

The environmental barrier 40 may also include additional layers located on the outer layer 42.

Figure 7:
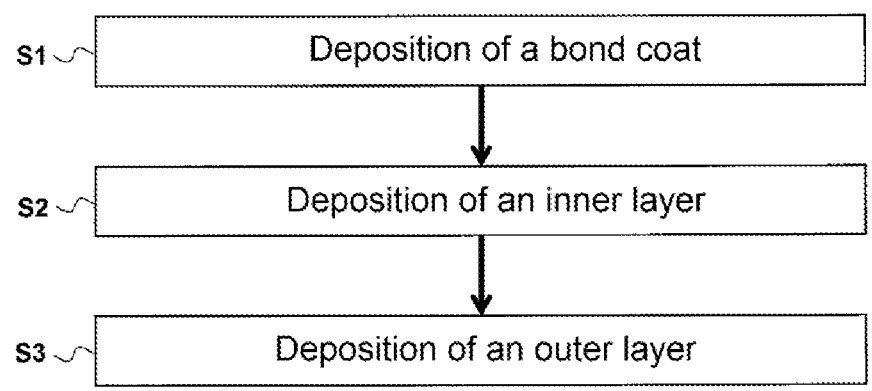
FIG. 7 schematically represents the different steps of a manufacturing process according to an implementation of the invention.

As shown in FIG. 7, according to a possible implementation, the component 10 manufacturing process comprises the following steps:

S1: deposition of the silicon-containing bond coat 30 on the surface S of the substrate 20;

S2 deposition of the inner layer 41 of the environmental barrier 40 on the bond coat 30;

S3 deposition of the outer layer 42 of the environmental barrier 40 on the inner layer 41, said outer layer 42 being ceramic.

According to a preferential implementation of the component 10 manufacturing process, the deposition of the inner layer 41 is carried out by plasma spraying in which the material for forming the particles 41p dispersed in the inner layer 41 is introduced into the plasma jet in the form of a suspension in a liquid medium.

Introducing the material intended to form the particles 41p into the plasma jet in the form of a suspension in a liquid medium makes it possible to use particles 41p with a small average size, in particular with an average size of less than 5 μm. Indeed, if the particles are not introduced into the plasma jet in the form of a suspension in a liquid medium, for example by being introduced in the form of a powder, the particles are likely to bounce off the plasma jet because of their excessively small size, thus making it difficult to control the deposition of the inner layer 41.

In addition, the introduction of the material intended to form the particles 41p in the plasma jet in the form of a suspension in a liquid medium allows a wider range of particles 41p to be used. Indeed, some materials, in particular silicon carbide (SiC), may have difficulty withstanding the introduction in powder form into the plasma jet and may be at risk of sublimation. Control of the deposition of the inner layer 41 with particles 41p of such materials, especially silicon carbide (SiC), is therefore made difficult. The introduction of the particles 41p into the plasma jet in the form of a suspension in a liquid medium protects these materials from the plasma jet and thus makes it easier to control the deposition of the inner layer 41.

Figure 4:
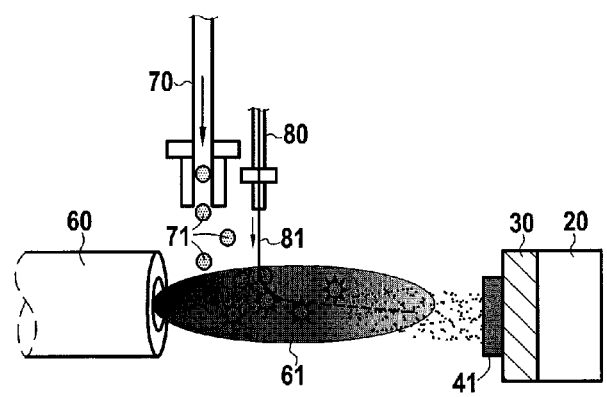
FIG. 4 shows a first possible embodiment for the deposition of the inner layer of the environmental barrier.

According to a first possible embodiment for the deposition of the inner layer 41 which is illustrated in FIG. 4, said inner layer 41 of the environmental barrier 40 is produced by plasma spraying using a plasma torch 60 which generates a plasma jet 61. Plasma spraying can be carried out at atmospheric pressure in air.

The material intended to form the matrix 41m of the inner layer 41 is injected into the plasma jet 61 using an injector 70 in the form of a powder 71. The powder 71 can, according to an example, be a $Y_2Si_2O_7$ powder with an average size of 30 μm.

The material intended to form the particles 41p of the inner layer 41 is injected into the plasma jet 61 by an injector 80 in the form of a suspension 81 in a liquid medium. The suspension 81 can be, according to an example, an aqueous suspension loaded with 20% by mass of silicon carbide (SiC) particles with an average size of 1 μm.

In the example shown in FIG. 4, an inner layer 41 comprising a $Y_2Si_2O_7$ matrix 41m and SiC particles with an average size of 1 μm is formed on the bond coat 30. The volume charge rate of particles 41p is 30% in this inner layer 41, and the thickness T of said inner layer is 150 μm.

Figure 5:
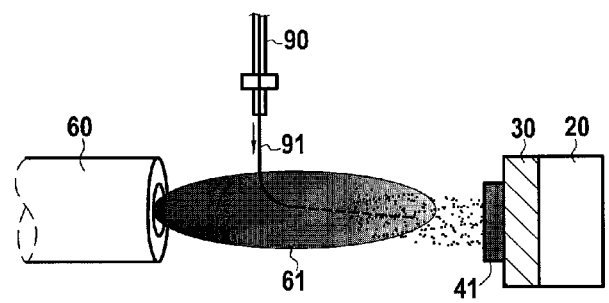
FIG. 5 shows a second possible embodiment for the deposition of the inner layer of the environmental barrier.

According to a second embodiment shown in FIG. 5, the material intended to form the matrix 41m of the inner layer 41 is not injected into the plasma jet in powder form, but in the form of a suspension 91 in a liquid medium comprising both the material intended to form the matrix 41m and the material intended to form the particles 41p. This suspension 91 is injected into the plasma jet 61 through a single injector 90.

According to an example, suspension 91 is an aqueous suspension loaded with 20% by mass of the materials intended to form the matrix 41m and the particles 41p. The proportion of the mixture between these two materials is adapted so that the volume charge rate of the particles 41p in the inner layer 41 is 30%. The suspension 91 comprises $Y_2Si_2O_7$ particles, with an average size of 30 μm, which are intended to form the matrix 41m (which will therefore be of $Y_2Si_2O_7$), and SiC particles, with an average size of 1 μm, which are intended to form the particles 41p (which will therefore be of SiC). The inner layer 41 formed has a thickness T of 150 μm.

Figure 6:
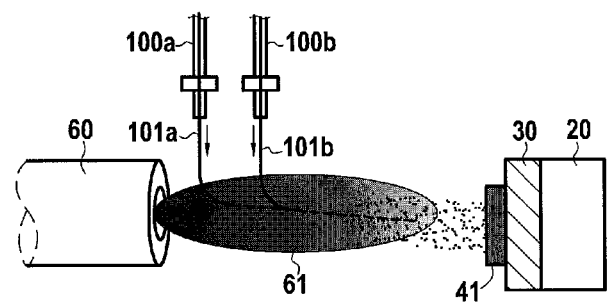
FIG. 6 shows a third possible embodiment for the deposition of the inner layer of the environmental barrier.

In a third embodiment illustrated in FIG. 6, the material intended to form the matrix 41m and the material intended to form the particles 41p are not injected into the plasma jet 61 in the same suspension, but in two separate suspensions 101a and 101b.

The first suspension 101a is an aqueous suspension which is loaded with 20% by mass of $Y_2Si_2O_7$ particles to form the matrix 41m which have an average size of 5 μm. The first suspension 101a is injected into the plasma jet 61 through a first injector 100a.

The second suspension 101b is an aqueous suspension which is loaded with 20% by mass of SiC particles to form the particles 41p, these particles having an average size of 1 μm. The second suspension 101b is injected into the plasma jet 61 through a second injector 100b. The inner layer 41 formed has a thickness T of 150 μm.

The phrase "between . . . and . . . " should be understood to include the bounds.

The invention claimed is:

1. A component consisting of:
    a substrate at least a portion of which adjacent to a surface of the substrate is made of a material comprising silicon;
    a bond coat located on the surface of the substrate and comprising silicon,
    an environmental barrier which comprises an outer layer of ceramic material covering the bond coat,
    wherein said environmental barrier further comprises a self-healing inner layer located between the bond coat and the outer layer, said inner layer comprising a matrix in which silico-forming particles are dispersed, the silico-forming particles being capable of generating a healing phase for cracks in the matrix in the presence of oxygen, the inner layer comprising a volume charge rate of the particles of between 20% and 40%.

2. The component as claimed in claim 1, wherein the silico-forming particles of the inner layer comprise ceramic particles.

3. The component as claimed in claim 2, wherein the silico-forming particles of the inner layer comprise particles of silicon carbide, or silicon nitride, or of a MAX phase comprising silicon, or a mixture of such particles.

4. The component as claimed in claim 1, wherein the particles of the inner layer comprise metal particles.

5. The component as claimed in claim 4, wherein the particles of the inner layer comprise particles of elemental silicon Si, or of a metal silicide, or a mixture of such particles.

6. The component as claimed in claim 1, wherein the particles of the inner layer have an average particle size less than or equal to 5 μm.

7. The component as claimed in claim 6, wherein the particles of the inner layer have an average particle size less than or equal to 2 μm.

8. The component as claimed in claim 1, wherein the inner layer has a thickness of between 10 μm and 300 μm.

9. The component as claimed in claim 8, wherein the inner layer has a thickness of between 100 μm and 200 μm.

10. The component as claimed in claim 1, wherein the matrix of the inner layer is of silicate.

11. The component as claimed in claim 10, wherein the matrix of the inner layer is of a rare earth monosilicate or disilicate, or an aluminosilicate.

12. The component as claimed in claim 11, wherein the matrix of the inner layer is made of mullite, or cordierite.

13. The component as claimed in claim 1, wherein the matrix of the inner layer and the outer layer are formed of the same material.

14. A process for manufacturing a component as claimed in of claim 1, comprising:
    depositing the bond coat comprising silicon on the surface of the substrate;
    depositing the inner layer of the environmental barrier on the bond coat;
    depositing the outer layer of the environmental barrier on the inner layer, said outer layer being ceramic.

15. The process as claimed in claim 14, wherein the deposition of the inner layer is carried out by plasma spraying in which a material for forming the particles is introduced into a plasma jet in the form of a suspension in a liquid medium.

* * * * *

UNITED STATES PATENT AND TRADEMARK OFFICE
CERTIFICATE OF CORRECTION

| | |
|---|---|
| PATENT NO. | : 11,465,943 B2 |
| APPLICATION NO. | : 16/753588 |
| DATED | : October 11, 2022 |
| INVENTOR(S) | : Luc Bianchi et al. |

It is certified that error appears in the above-identified patent and that said Letters Patent is hereby corrected as shown below:

In the Claims

Column 8, Line 53, Claim 14, should read:
14. A process for manufacturing a component as claimed in claim 1, comprising:
depositing the bond coat comprising silicon on the surface of the substrate;
depositing the inner layer of the environmental barrier on the bond coat;
depositing the outer layer of the environmental barrier on the inner layer, said outer layer being ceramic.

Signed and Sealed this
Fifteenth Day of November, 2022

Katherine Kelly Vidal
*Director of the United States Patent and Trademark Office*